US012568514B2

(12) United States Patent
Shinohara et al.

(10) Patent No.: US 12,568,514 B2
(45) Date of Patent: Mar. 3, 2026

(54) WIRELESS COMMUNICATION MANAGEMENT APPARATUS, WIRELESS COMMUNICATION MANAGEMENT METHOD, AND WIRELESS COMMUNICATION MANAGEMENT PROGRAM

(71) Applicant: NTT, Inc., Tokyo (JP)

(72) Inventors: Shoko Shinohara, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 318 days.

(21) Appl. No.: 18/268,587

(22) PCT Filed: Dec. 25, 2020

(86) PCT No.: PCT/JP2020/048622
§ 371 (c)(1),
(2) Date: Jun. 20, 2023

(87) PCT Pub. No.: WO2022/137480
PCT Pub. Date: Jun. 30, 2022

(65) Prior Publication Data
US 2024/0314827 A1     Sep. 19, 2024

(51) Int. Cl.
*H04W 72/541*     (2023.01)
*H04W 72/02*      (2009.01)
(Continued)

(52) U.S. Cl.
CPC ......... *H04W 72/541* (2023.01); *H04W 72/02* (2013.01); *H04W 72/0453* (2013.01); *H04W 72/51* (2023.01)

(58) Field of Classification Search
CPC .... H04W 72/541; H04W 72/02; H04W 72/51
See application file for complete search history.

(56) References Cited

U.S. PATENT DOCUMENTS

2007/0054645 A1 *  3/2007  Pan ........................ H04W 24/08
                                                   455/266
2009/0034457 A1 *  2/2009  Bahl ..................... H04W 16/10
                                                   370/329

(Continued)

FOREIGN PATENT DOCUMENTS

JP          2017152953 A      8/2017

OTHER PUBLICATIONS

ARIB STD-T108 1.3, "920 MHz-Band Telemeter, Telecontrol and Data Transmission Radio Equipment and Standards", Apr. 12, 2019.
(Continued)

*Primary Examiner* — Raj Jain

(57)          ABSTRACT

A wireless communication management apparatus includes a determination unit, an evaluation unit, and a selection unit. The determination unit determines an interference relationship of a combination of bandwidth and channel on the basis of wireless environment information collected from one or more terminals capable of wireless communication with a base station. The evaluation unit calculates an evaluation value for each combination of bandwidth and channel on the basis of the interference relationship. The selection unit selects one combination from the combinations of bandwidth and channel on the basis of the evaluation value.

7 Claims, 11 Drawing Sheets

(51) Int. Cl.
      *H04W 72/0453*      (2023.01)
      *H04W 72/51*         (2023.01)

(56)                      References Cited

U.S. PATENT DOCUMENTS

| | | | | |
|---|---|---|---|---|
| 2016/0234855 A1* | 8/2016 | Panteleev | ............. | H04W 76/19 |
| 2016/0249351 A1* | 8/2016 | Wang | .................... | H04W 72/23 |
| 2017/0251481 A1 | 8/2017 | Nakayama et al. | | |
| 2023/0095822 A1* | 3/2023 | Oteri | ................. | H04W 74/0816 |
| | | | | 370/277 |
| 2024/0314827 A1* | 9/2024 | Shinohara | ......... | H04W 72/0453 |

OTHER PUBLICATIONS

IEEE STD 802.11ah TM-2016 (IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation, IEEE Computer Society, Dec. 7, 2016.

\* cited by examiner

Fig. 2

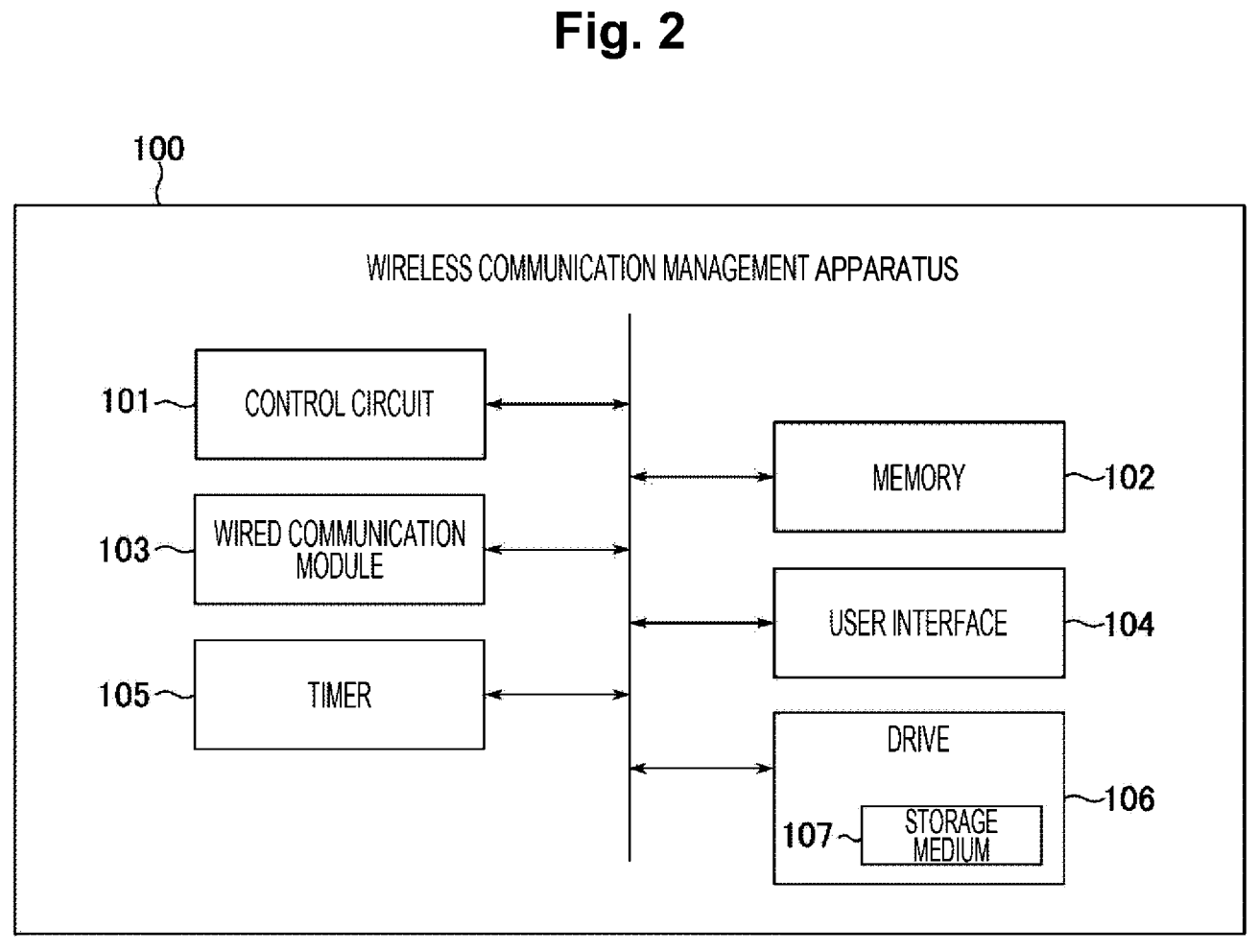

WIRELESS COMMUNICATION MANAGEMENT APPARATUS

100

101 — CONTROL CIRCUIT

103 — WIRED COMMUNICATION MODULE

105 — TIMER

102 — MEMORY

104 — USER INTERFACE

106 — DRIVE

107 — STORAGE MEDIUM

Figure 5:
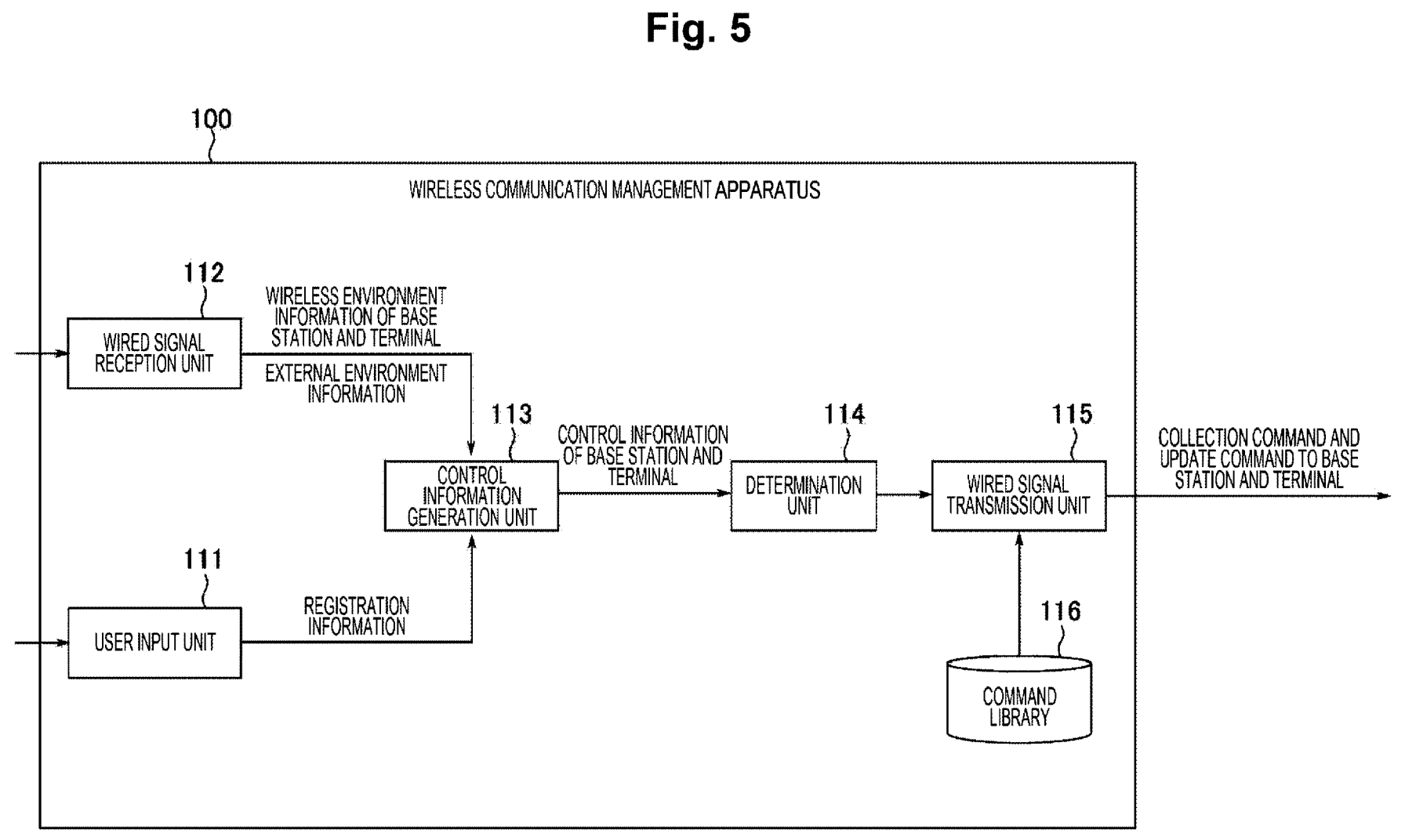

WIRELESS COMMUNICATION MANAGEMENT APPARATUS

100

COLLECTION COMMAND AND UPDATE COMMAND TO BASE STATION AND TERMINAL

115 WIRED SIGNAL TRANSMISSION UNIT

116 COMMAND LIBRARY

114 DETERMINATION UNIT

CONTROL INFORMATION OF BASE STATION AND TERMINAL

113 CONTROL INFORMATION GENERATION UNIT

WIRELESS ENVIRONMENT INFORMATION OF BASE STATION AND TERMINAL

EXTERNAL ENVIRONMENT INFORMATION

112 WIRED SIGNAL RECEPTION UNIT

REGISTRATION INFORMATION

111 USER INPUT UNIT

Fig. 6

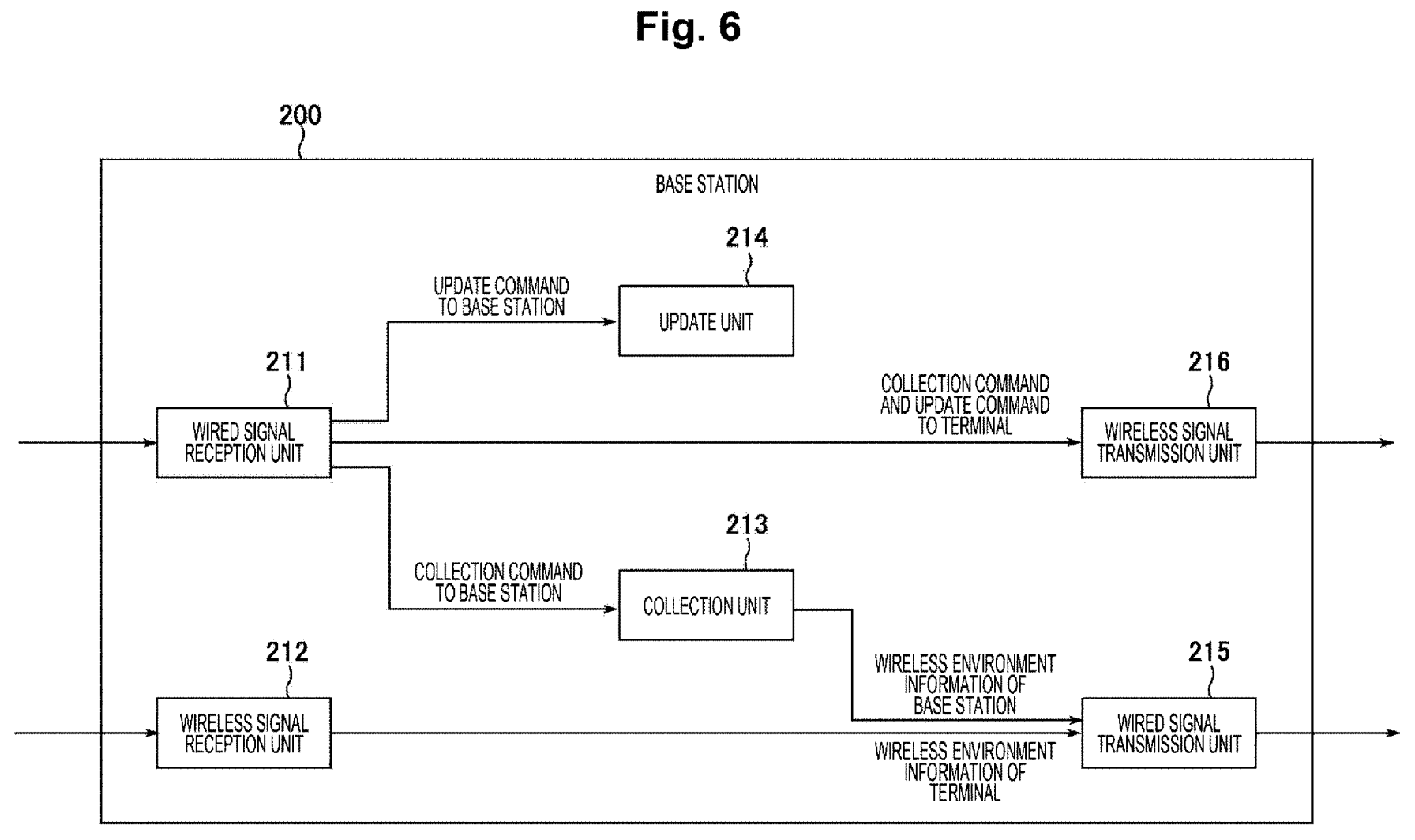

BASE STATION

200

211 — WIRED SIGNAL RECEPTION UNIT

212 — WIRELESS SIGNAL RECEPTION UNIT

214 — UPDATE UNIT

213 — COLLECTION UNIT

216 — WIRELESS SIGNAL TRANSMISSION UNIT

215 — WIRED SIGNAL TRANSMISSION UNIT

UPDATE COMMAND TO BASE STATION

COLLECTION COMMAND TO BASE STATION

COLLECTION COMMAND AND UPDATE COMMAND TO TERMINAL

WIRELESS ENVIRONMENT INFORMATION OF BASE STATION

WIRELESS ENVIRONMENT INFORMATION OF TERMINAL

Figure 7:
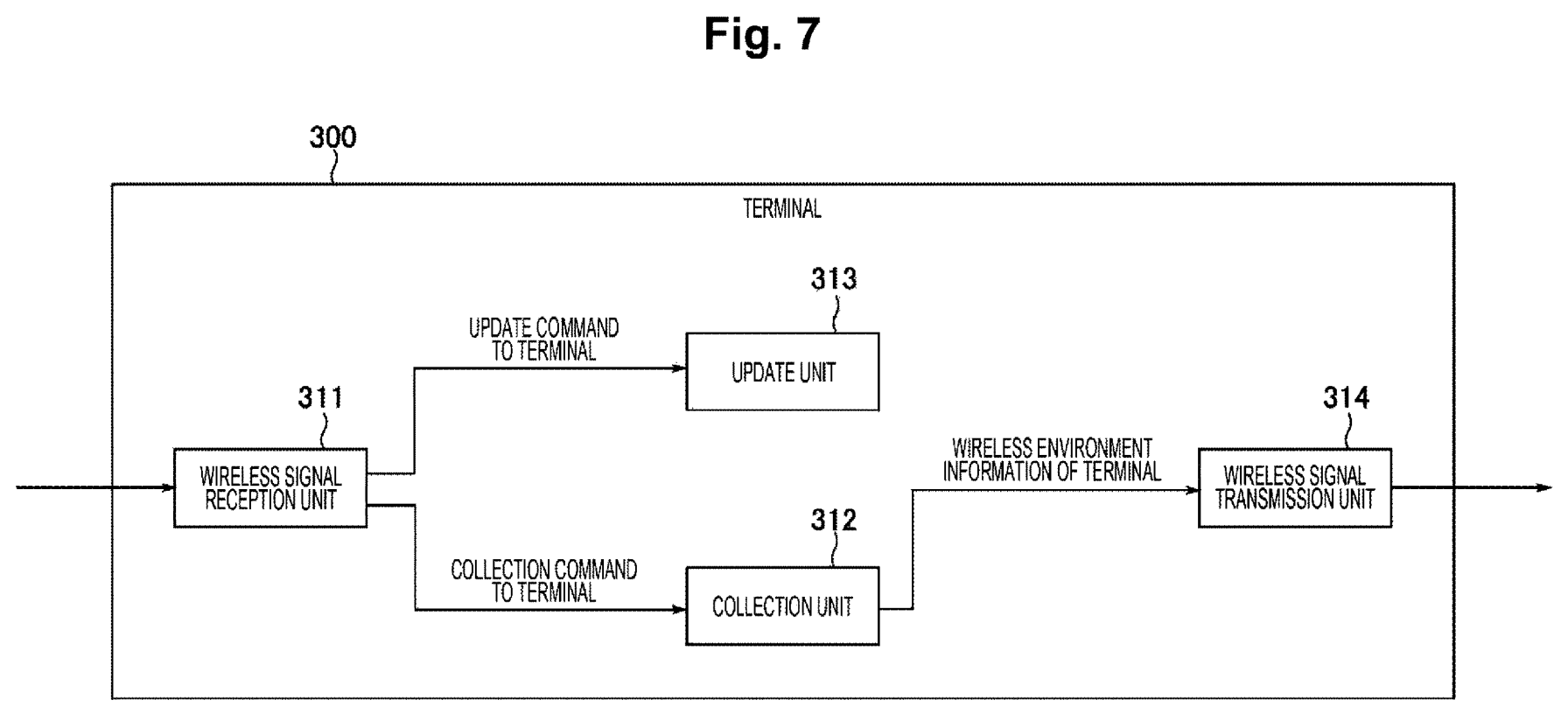

TERMINAL

311

WIRELESS SIGNAL
RECEPTION UNIT

UPDATE COMMAND
TO TERMINAL

COLLECTION COMMAND
TO TERMINAL

313

UPDATE UNIT

312

COLLECTION UNIT

WIRELESS ENVIRONMENT
INFORMATION OF TERMINAL

314

WIRELESS SIGNAL
TRANSMISSION UNIT

WIRELESS COMMUNICATION MANAGEMENT APPARATUS, WIRELESS COMMUNICATION MANAGEMENT METHOD, AND WIRELESS COMMUNICATION MANAGEMENT PROGRAM

CROSS-REFERENCE TO RELATED APPLICATIONS

This application is a 371 U.S. National Phase of International Application No. PCT/JP2020/048622, filed on Dec. 25, 2020. The entire disclosure of the above application is incorporated herein by reference.

FIELD

An embodiment relates to a wireless communication management apparatus, a wireless communication management method, and a wireless communication management program.

BACKGROUND OF THE INVENTION

A wireless communication system including a base station and a terminal is known. A typical example of a wireless communication system is a wireless local area network (LAN) for public use. As a wireless LAN for public use, for example, a use case in which data is transmitted from a base station to a public computer terminal and a smartphone terminal is assumed. On the other hand, in recent years, a wireless LAN for industrial use has appeared. As a wireless LAN for industrial use, for example, a use case in which data measured by an Internet of things (IoT) terminal is transmitted to a base station is assumed.

CITATION LIST

Non Patent Literature 1: ARIB STD-T108 1.3, "920 MHz-Band Telemeter, Telecontrol and Data Transmission Radio Equipment and Standards", Apr. 12, 2019
Non Patent Literature 2: IEEE Std 802.11ah TM-2016 (IEEE Standard for Information technology-Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation, IEEE Computer Society, 7 Dec. 2016

SUMMARY

Technical Problem

In a use case of a wireless LAN for public use, data transmission (downlink traffic) from a base station to an unspecified number of terminals is assumed to be the main communication. Therefore, in a case of managing a wireless LAN for public use, various types of control information are generated on the basis of the wireless environment of the base station. In other words, when managing a wireless LAN for public use, the wireless environment of a terminal is not considered.

On the other hand, in a use case of a wireless LAN for industrial use, data transmission (uplink traffic) from a specific large number of terminals to a base station is assumed to be the main communication. Therefore, in a case where the management method of the wireless environment of a wireless LAN for public use is applied to a wireless LAN for industrial use, it may be difficult to curb a decrease in throughput.

The present invention has been made in view of the above circumstances, and an object thereof is to provide means that can curb a decrease in throughput in a wireless communication system in which upstream traffic is assumed to be the main communication.

Solution to Problem

A wireless communication management apparatus of one aspect includes a determination unit, an evaluation unit, and a selection unit. The determination unit determines an interference relationship of a combination of bandwidth and channel on the basis of wireless environment information collected from one or more terminals capable of wireless communication with a base station. The evaluation unit calculates an evaluation value for each combination of bandwidth and channel on the basis of the interference relationship. The selection unit selects one combination from the combinations of bandwidth and channel on the basis of the evaluation value.

Advantageous Effects of Invention

According to the embodiment, it is possible to provide a method that can curb a decrease in throughput in a wireless communication system in which uplink traffic is assumed to be the main communication.

BRIEF DESCRIPTION OF THE DRAWINGS

FIG. 2 is a block diagram illustrating an example of a hardware configuration of a wireless communication management apparatus according to the embodiment.
FIG. 3 is a block diagram illustrating an example of a hardware configuration of a base station according to the embodiment.
FIG. 4 is a block diagram illustrating an example of a hardware configuration of a terminal according to the embodiment.
FIG. 5 is a block diagram illustrating an example of a functional configuration of the wireless communication management apparatus according to the embodiment.
FIG. 6 is a block diagram illustrating an example of a functional configuration of the base station according to the embodiment.
FIG. 7 is a block diagram illustrating an example of a functional configuration of the terminal according to the embodiment.

DETAILED DESCRIPTION

Figure 1:
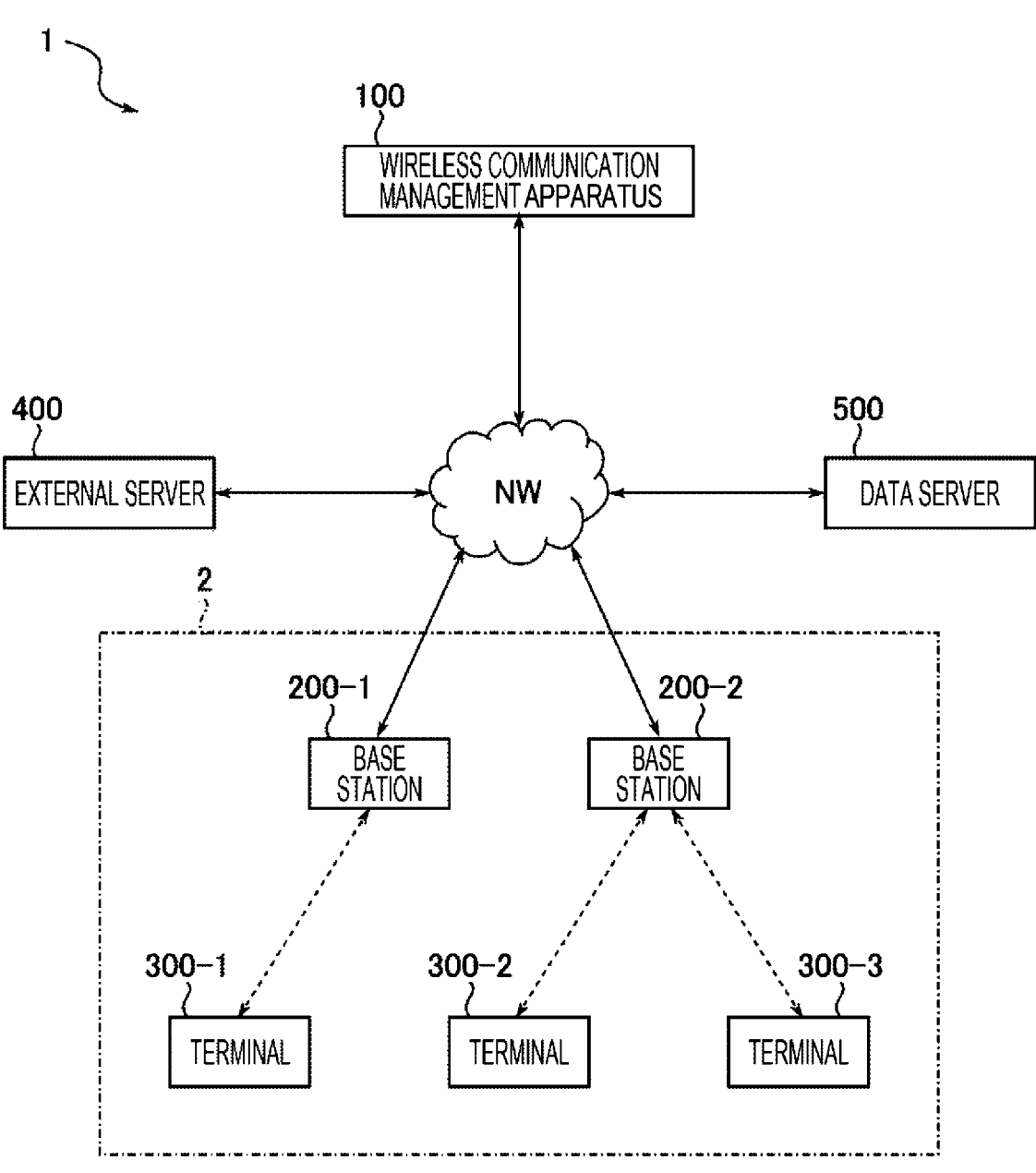
FIG. 1 is a block diagram illustrating an example of a configuration of a communication system according to an embodiment.

Hereinafter, an embodiment will be described with reference to the drawings. Note that in the following description, components having the same function and configuration are denoted by the same reference numerals. In addition, when distinguishing among a plurality of components having a common reference sign, the component is distinguished by an additional reference sign (e.g., hyphen and number such as "−1") attached after the common reference sign.

FIG. 1 is a block diagram illustrating an example of the configuration of the communication system according to the embodiment. As illustrated in FIG. 1, a communication system 1 is a system that manages a wireless environment of a wireless communication system 2. The communication system 1 includes a wireless communication management apparatus 100, a plurality of base stations 200-1 and 200-2, a plurality of terminals 300-1, 300-2, and 300-3, an external server 400, and a data server 500. The plurality of base stations 200-1 and 200-2 and the plurality of terminals 300-1 to 300-3 form the wireless communication system 2.

Hereinafter, each of the plurality of base stations 200-1 and 200-2 may be referred to as "base station 200" unless otherwise distinguished. Each of the plurality of terminals 300-1 to 300-3 may be referred to as "terminal 300" unless otherwise distinguished. Furthermore, the base station 200 and the terminal 300 may be collectively referred to as "apparatus".

The wireless communication system 2 is a wireless communication system for industrial use. The wireless communication system 2 is configured to use a frequency band (unlicensed band) that can be used without a wireless station license. In the wireless communication system 2, for example, a sub-GHz band is used as an unlicensed band. The sub-GHz band includes, for example, the 920 MHz band.

The wireless communication management apparatus 100 is an on-premises data processing server for managing a wireless environment of the wireless communication system 2. The wireless communication management apparatus 100 is configured to establish wired connection with the base station 200, the external server 400, and the data server 500 via, for example, a router or a hub (not illustrated) in a network NW.

The base station 200 is a master unit (AP: access point) of the wireless communication system 2. The base station 200 is configured to connect the terminal 300 and the wireless communication management apparatus 100 and connect the terminal 300 and the data server 500 via the network NW.

The terminal 300 is a slave unit (STA: station) of the wireless communication system 2. The terminal 300 is, for example, an IoT terminal. The terminal 300 is configured to wirelessly connect to a corresponding base station 200.

In the example of FIG. 1, the terminal 300-1 is configured to wirelessly connect to the base station 200-1. The terminals 300-2 and 300-3 are configured to wirelessly connect to the base station 200-2. However, the terminal 300-1 may also be configured to wirelessly connect to the base station 200-2. The terminals 300-2 and 300-3 may also be configured to wirelessly connect to the base station 200-1. In this manner, the wireless connection between the terminal 300 and the base station 200 may be appropriately selected from a plurality of paths. The external server 400 is a server that stores information (external environment information)

regarding the external environment of the wireless communication system 2. The data server 500 is a server in which sensor information measured by the wireless communication system 2 is aggregated and stored.

FIG. 2 is a block diagram illustrating an example of a hardware configuration of the wireless communication management apparatus according to the embodiment. The wireless communication management apparatus 100 includes a control circuit 101, a memory 102, a wired communication module 103, a user interface 104, a timer 105, and a drive 106.

The control circuit 101 is a circuit that has overall control of the components of the wireless communication management apparatus 100. The control circuit 101 includes a central processing unit (CPU), a random access memory (RAM), a read only memory (ROM), and the like. The memory 102 is an auxiliary storage device of the wireless communication management device 100. The memory 102 includes, for example, a hard disk drive (HDD), a solid state drive (SSD), a memory card, and the like. The memory 102 stores various types of information used for a wireless communication management operation and a wireless communication management program. The wireless communication management program can be stored in the memory 102 by being transmitted from outside the wireless communication management apparatus 100 via the network NW.

The wireless communication management operation is a series of operations performed to appropriately manage a wireless communication environment in the wireless communication system 2. The wireless communication management program is a program for causing the control circuit 101 to perform the wireless communication management operation. Details regarding the wireless communication management operation will be described later.

The wired communication module 103 is a circuit used for transmission and reception of data by a wired signal. The wired communication module 103 is configured, for example, to conform to the TCP/IP hierarchical model. Specifically, for example, a configuration of the wired communication module 103 corresponding to the network interface layer is compliant with Ethernet. A configuration of the wired communication module 103 corresponding to the Internet layer is compliant with the Internet protocol (IP). A configuration of the wired communication module 103 corresponding to the transport layer is compliant with the transmission control protocol (TCP). A configuration of the wired communication module 103 corresponding to the application layer is compliant with the Secure shell (SSH).

The user interface 104 is a circuit for communicating information between the user and the control circuit 101. The user interface 104 includes an input device and a display device. The input device includes, for example, a touch panel, an operation button, and the like. The display device includes, for example, a liquid crystal display (LCD), an electroluminescence (EL) display, and the like. The user interface 104 converts an input (user input) from the user into an electrical signal, and then transmits the electrical signal to the control circuit 101.

The timer 105 is a circuit that measures time. For example, the timer 105 starts counting on the basis of a start instruction from the control circuit 101 (set). When the count value becomes equal to or larger than a threshold in the set state, the timer 105 notifies the control circuit 101 of a timeout (timeout). The timer 105 ends counting on the basis of an end instruction from the control circuit 101 (reset).

The drive 106 is a device for reading a program stored in a storage medium 107. The drive 106 includes, for example, a compact disk (CD) drive, a digital versatile disk (DVD) drive, and the like. The storage medium 107 is a medium that accumulates information such as programs by electrical, magnetic, optical, mechanical, or chemical action. The storage medium 107 may store the wireless communication management program.

Figure 3:
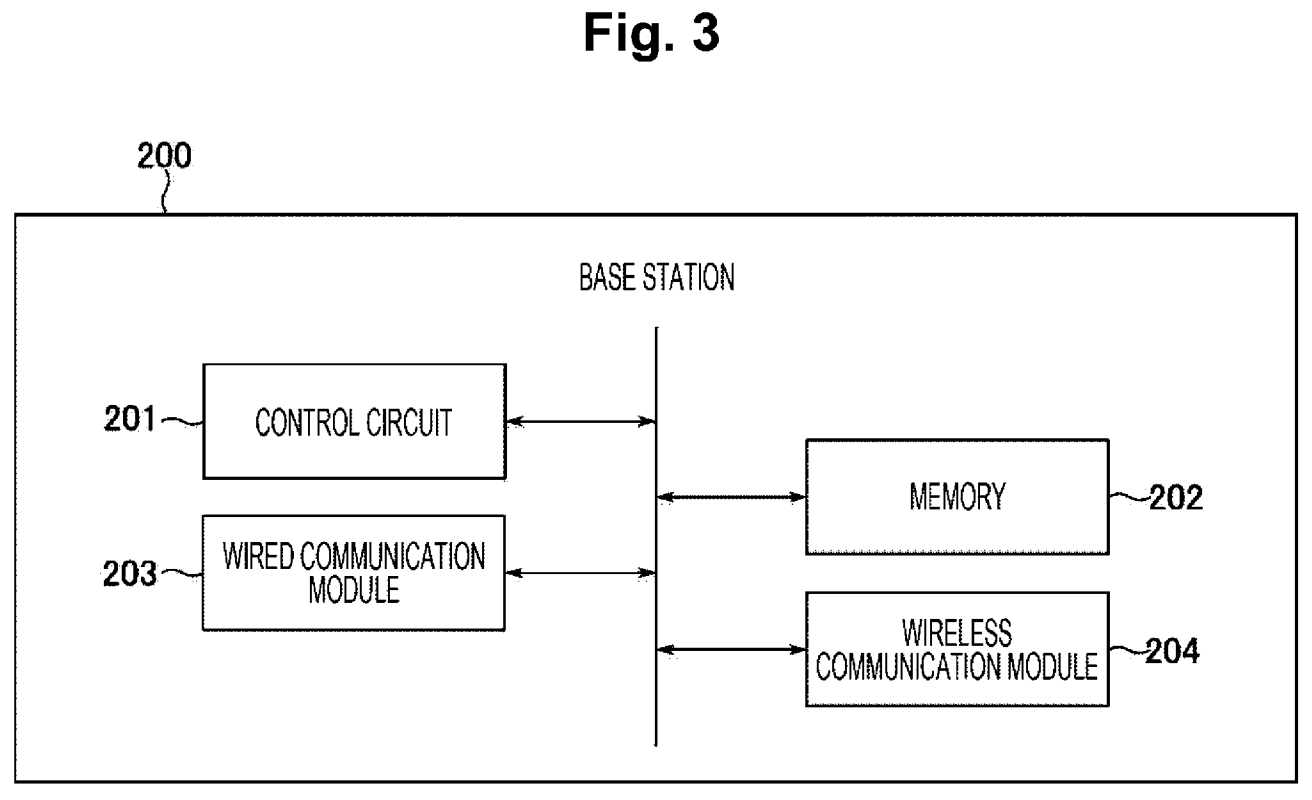

FIG. 3 is a block diagram illustrating an example of a hardware configuration of the base station according to the embodiment. The base station 200 includes a control circuit 201, a memory 202, a wired communication module 203, and a wireless communication module 204. The control circuit 201 is a circuit that has overall control of the component of the base station 200. The control circuit 201 includes a CPU, a RAM, a ROM, and the like. The memory 202 is an auxiliary storage device of the base station 200. The memory 202 includes, for example, an HDD, an SSD, a memory card, and the like. The memory 202 stores control information of the base station 200 generated by the wireless communication management apparatus 100 in the wireless communication management operation. The wired communication module 203 is a circuit used for transmission and reception of data by a wired signal. The wired communication module 203 conforms to a protocol stack equivalent to that of the wired communication module 103. With this configuration, the wired communication module 203 can be connected to the wired communication module 103 by wire.

The wireless communication module 204 is a circuit used for transmission and reception of data by a wireless signal. The wireless communication module 204 is connected to an antenna (not illustrated). The wireless communication module 204 is configured, for example, to conform to the TCP/IP hierarchical model. Specifically, for example, a configuration of the wireless communication module 204 corresponding to the network interface layer is compliant with Institute of electrical and electronics engineers (IEEE) 802.11 ah. A configuration of the wireless communication module 204 corresponding to the Internet layer is compliant with the IP. A configuration of the wireless communication module 204 corresponding to the transport layer is compliant with the TCP. A configuration of the wireless communication module 204 corresponding to the application layer is compliant with the SSH.

Figure 4:
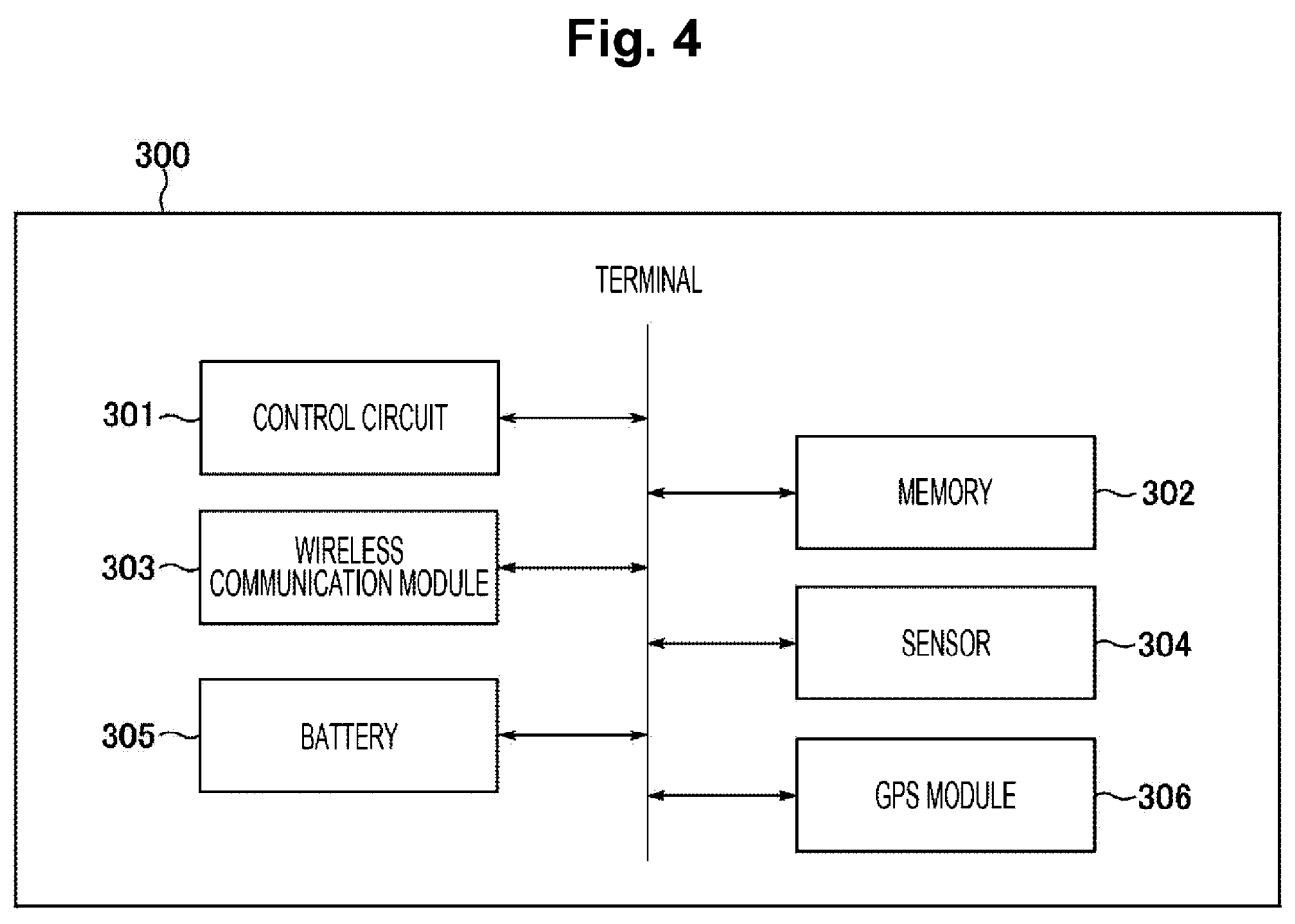

FIG. 4 is a block diagram illustrating an example of a hardware configuration of the terminal according to the embodiment. The terminal 300 includes a control circuit 301, a memory 302, a wireless communication module 303, a sensor 304, a battery 305, and a global positioning system (GPS) module 306. The control circuit 301 is a circuit that has overall control of the components of the terminal 300. The control circuit 301 includes a CPU, a RAM, a ROM, and the like. The memory 302 is an auxiliary storage device of the terminal 300. The memory 302 includes, for example, an HDD, an SSD, a memory card, and the like. The memory 302 stores control information generated by the wireless communication management apparatus 100 in the wireless communication management operation and sensor information measured by the sensor 304.

The wireless communication module 303 is a circuit used for transmission and reception of data by a wireless signal. The wireless communication module 303 conforms to a protocol stack equivalent to that of the wireless communication module 204. With this configuration, the wireless communication module 303 can be wirelessly connected to the wireless communication module 204. The sensor 304 is a circuit that measures data monitored by the wireless communication system 2. Sensor information measured by the sensor 304 is aggregated in the data server 500 via the base station 200 and the network NW. The battery 305 is a capacity for supplying power to the terminal 300. The battery 305 is charged by, for example, a solar power generation module (not illustrated). The GPS module 306 is a circuit capable of receiving radio waves from GPS satellites and acquiring position data of the terminal apparatus 300. Note that while FIG. 4 describes a case where the terminal 300 supplies power by charging the battery 305 by solar power generation, the present invention is not limited thereto. For example, the terminal 300 may be stably supplied with power from a power supply. In addition, when the wireless communication system 2 does not use the position information of the terminal 300, the GPS module 306 may be omitted from the terminal 300.

FIG. 5 is a block diagram illustrating an example of a functional configuration of the wireless communication management apparatus according to the embodiment. The CPU of the control circuit 101 loads the wireless communication management program stored in the memory 102 or the storage medium 107 into the RAM. Then, the CPU of the control circuit 101 controls each of the components 102 to 106 by interpreting and executing the wireless communication management program expanded in the RAM. As a result, as illustrated in FIG. 5, the wireless communication management apparatus 100 functions as a computer including a user input unit 111, a wired signal reception unit 112, a control information generation unit 113, a determination unit 114, a wired signal transmission unit 115, and a command library 116.

The user input unit 111 transmits registration information input by the user to the control information generation unit 113. Registration information includes device information and constraint information. Device information is information for the wireless communication management apparatus 100 to uniquely identify the base station 200 and the terminal 300. Device information includes, for example, a username, a password, an IP address, a management target flag, and the like for each of the base station 200 and the terminal 300. The username, the password, and the IP address are used for the wireless communication management apparatus 100 to log in to the base station 200 and the terminal 300 by SSH. The management target flag is information for identifying whether or not the corresponding base station 200 and terminal 300 are targets of the wireless communication management operation. Constraint information is information indicating constraint conditions to be complied with by the wireless communication system 2 on the basis of laws such as the Radio law. Constraint information includes, for example, an upper limit value of the total transmission time for each apparatus.

The wired signal reception unit 112 receives wireless environment information of the base station 200 and the terminal 300 from the base station 200. The wired signal reception unit 112 receives external environment information from the external server 400. The wired signal reception unit 112 transmits the received pieces of environment information to the control information generation unit 113.

Wireless environment information is information collected from the base station 200 and the terminal 300 to evaluate the throughput of wireless communication in the wireless communication management operation. The wireless environment information includes, for example, information (SSID, channel, bandwidth, frequency, received signal strength indication (RSSI)) related to a peripheral basic service set (BSS) as information common to the base station 200 and the terminal 300. Furthermore, wireless environment information can include, for example, information indicating the remaining capacity of the battery 305 as information specific to the terminal 300. External environment information is information collected from the external server 400 to evaluate the throughput of wireless communication. External environment information includes, for example, a predicted value of sunshine hours in an area where the wireless communication system 2 is provided. The control information generation unit 113 generates control information of the base station 200 and the terminal 300 on the basis of registration information, wireless environment information of the base station 200 and the terminal 300, and external environment information. The control information generation unit 113 may store the received pieces of information in the memory 102 until all the information used for the wireless communication management operation is prepared. The control information generation unit 113 transmits the generated control information to the determination unit 114.

Control information is a parameter used for constructing a wireless communication environment of the base station 200 and the terminal 300. The control information of a certain device is generated on the basis of at least the wireless environment information collected from the certain device. The control information of a certain device can be generated further on the basis of wireless environment information collected from devices other than the certain device. Control information includes access parameters, channels, and transmission rates of the base station 200 and the terminal 300. In addition, control information includes information indicating transmission time zones and a transmission frequency (duty ratio) of the base station 200 and the terminal 300.

The determination unit 114 determines whether or not to update the setting of the wireless environment by the generated control information for each of the base station 200 and the terminal 300 for which the control information has been generated. In addition, the determination unit 114 further determines, for each of the base station 200 and the terminal 300 determined to update the setting of the wireless environment, whether or not the update involves a restart. The determination unit 114 transmits a set of control information and a determination result for each of the base station 200 and the terminal 300 to the wired signal transmission unit 115.

The wired signal transmission unit 115 generates various commands for controlling the base station 200 and the terminal 300 on the basis of an instruction from the control circuit 101. The various commands are generated with reference to the command library 116. In the command library 116, a command group used for the wireless communication management operation is stored in advance. The command library 116 stores, for example, a collection command and an update command. The collection command is a command for collecting wireless environment information from the designated base station 200 or terminal 300 (designated by IP address or the like). The update command is a command for updating the setting of the wireless environment of the designated base station 200 or terminal 300 (designated by IP address or the like) with the control information. Therefore, the update command includes control information (e.g., channel, bandwidth, and the like) for updating the setting of the wireless environment of the designated base station 200 or terminal 300. In addition, the update command may include an instruction to restart the designated base station 200 or terminal 300.

FIG. 6 is a block diagram illustrating an example of a functional configuration of the base station according to the embodiment. The CPU of the control circuit 201 controls each of the components 202 to 204 on the basis of various commands transmitted from the wireless communication management apparatus 100. As a result, as illustrated in FIG. 6, the base station 200 functions as a computer including a wired signal reception unit 211, a wireless signal reception unit 212, a collection unit 213, an update unit 214, a wired signal transmission unit 215, and a wireless signal transmission unit 216.

The wired signal reception unit 211 receives a collection command and an update command from the wireless communication management apparatus 100. When receiving a collection command (to base station 200) addressed to the base station 200, the wired signal reception unit 211 transmits the collection command to the collection unit 213. When receiving an update command to the base station 200, the wired signal reception unit 211 transmits the update command to the update unit 214. When receiving a collection command and an update command (to terminal 300) addressed to the terminal 300, the wired signal reception unit 211 transmits the collection command and the update command to the wireless signal transmission unit 216. When data is transmitted from the wired signal reception unit 211 to the wireless signal transmission unit 216, the transmission data is converted from the Ethernet frame format to the 802.11 ah frame format.

The wireless signal reception unit 212 receives wireless environment information of the terminal 300 from the terminal 300. The wireless signal reception unit 212 transmits the received wireless environment information of the terminal 300 to the wired signal transmission unit 215. When data is transmitted from the wireless signal reception unit 212 to the wired signal transmission unit 215, the transmission data is converted from the 802.11 ah frame format to the Ethernet frame format. The collection unit 213 collects wireless environment information of the base station 200 on the basis of the received collection command. The collection unit 213 transmits the collected wireless environment information of the base station 200 to the wired signal transmission unit 215.

The update unit 214 updates the setting of the wireless environment of the base station 200 with control information in the update command on the basis of the received update command. When the update command includes a restart instruction, the update unit 214 restarts the base station 200. The wired signal transmission unit 215 transmits the received wireless environment information of the base station 200 to the wireless communication management apparatus 100. The wired signal transmission unit 215 transfers the received wireless environment information of the terminal 300 to the wireless communication management apparatus 100. The wireless signal transmission unit 216 transfers the received collection command and update command of the terminal 300 to the terminal 300.

FIG. 7 is a block diagram illustrating an example of a functional configuration of the terminal according to the embodiment. The CPU of the control circuit 301 controls each of the components 302 and 303 on the basis of various commands transmitted from the wireless communication management apparatus 100. As a result, as illustrated in FIG. 7, the terminal 300 functions as a computer including a wireless signal reception unit 311, a collection unit 312, an update unit 313, and a wireless signal transmission unit 314.

The wireless signal reception unit 311 receives a collection command and an update command from the base station 200. The wireless signal reception unit 311 transmits the collection command to the collection unit 312. The wireless signal reception unit 311 transmits the update command to the update unit 313. The collection unit 312 collects wireless environment information of the terminal 300 on the basis of the received collection command. The collection unit 312 transmits the collected wireless environment information of the terminal 300 to the wireless signal transmission unit 314. The update unit 313 updates the setting of the wireless environment of the terminal 300 with control information in the update command on the basis of the received update command. When the update command includes a restart instruction, the update unit 313 restarts the terminal 300. The wireless signal transmission unit 314 transmits the collected wireless environment information of the terminal 300 to the base station 200.

Figure 8:
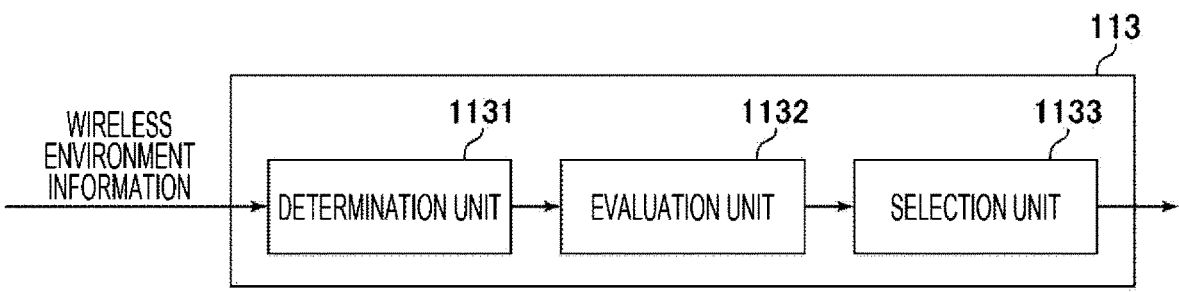
FIG. 8 is a block diagram illustrating an example of a detailed configuration of a control information generation unit according to the embodiment.

FIG. 8 is a block diagram illustrating an example of a detailed configuration of the control information generation unit 113 according to the embodiment. The control information generation unit 113 includes a determination unit 1131, an evaluation unit 1132, and a selection unit 1133. Each of the determination unit 1131, the evaluation unit 1132, and the selection unit 1133 performs a part of processing performed by the control information generation unit 113.

Figure 9:
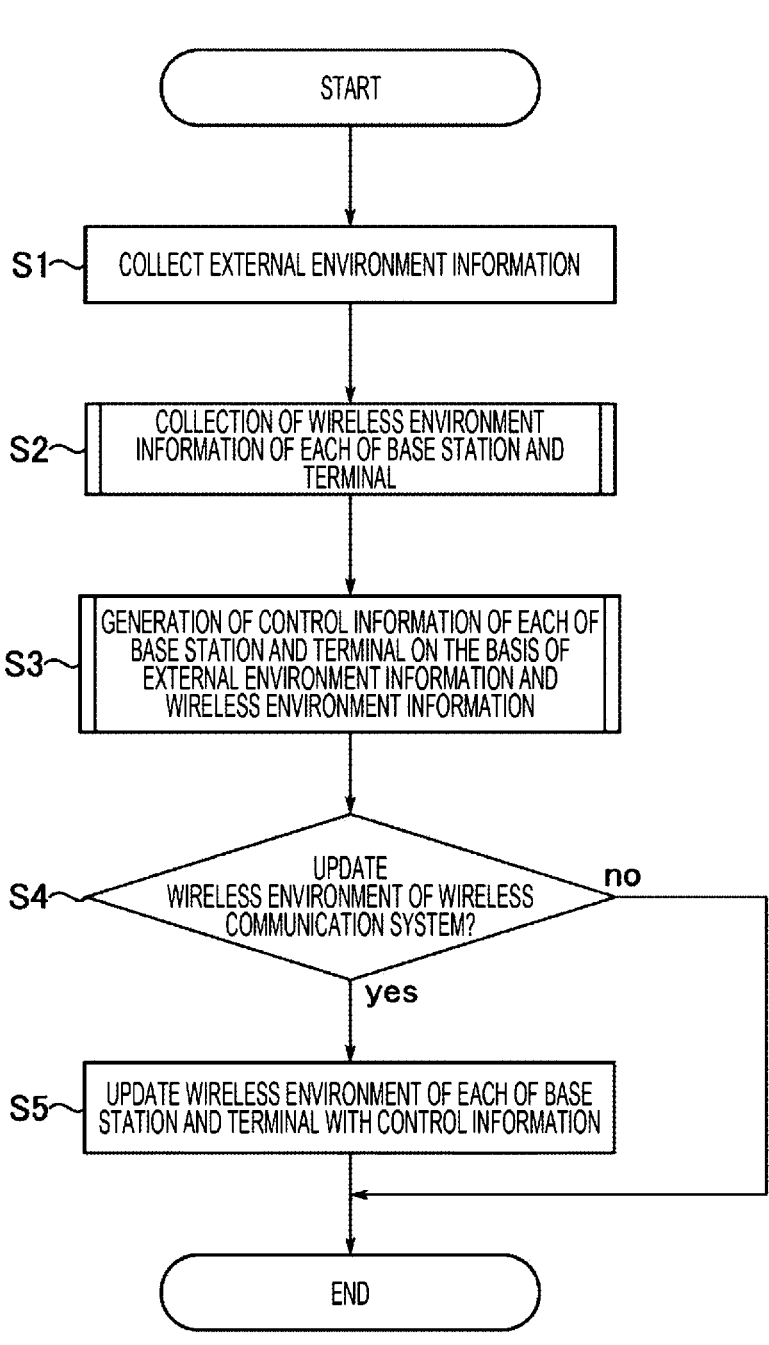
FIG. 9 is a flowchart illustrating an example of the wireless communication management operation in the wireless communication management apparatus according to the embodiment.

Next, an operation of the communication system according to the embodiment will be described. FIG. 9 is a flowchart illustrating an example of the wireless communication management operation in the wireless communication management apparatus according to the embodiment. In FIG. 9, it is assumed that registration information is stored in the memory 102 in advance by user input. In addition, it is assumed that the wireless communication management apparatus 100 has logged in to each apparatus stored in the registration information by SSH.

As illustrated in FIG. 9, when a start condition of a wireless communication monitoring operation such as elapse of a predetermined time interval is satisfied, the wireless communication management apparatus 100 collects external environment information from the external server 400 (S1). External environment information includes, for example, a predicted value of sunshine hours in an area where the wireless communication system 2 is provided. The wireless communication management apparatus 100 collects wireless environment information from each of the base station 200 and the terminal 300 (S2). The processing of S2 may be performed before the processing of S1, or may be performed in parallel with the processing of step S1. The wireless communication management apparatus 100 generates control information of each of the base station 200 and the terminal 300 on the basis of the collected external environment information and wireless environment information (S3).

The wireless communication management apparatus 100 determines whether or not to update the setting of the wireless environment of the wireless communication system 2 (S4). If it is determined to update the setting of the wireless environment (S4—Yes), the processing proceeds to S5. If it is determined that the setting of the wireless environment is not to be updated (S4—No), the wireless communication management operation ends. The wireless communication management apparatus 100 updates the setting of the wireless environment of each of the base station 200 and the terminal 300 with the control information (S5). When the processing of S5 ends, the wireless communication management operation ends.

Figure 10:
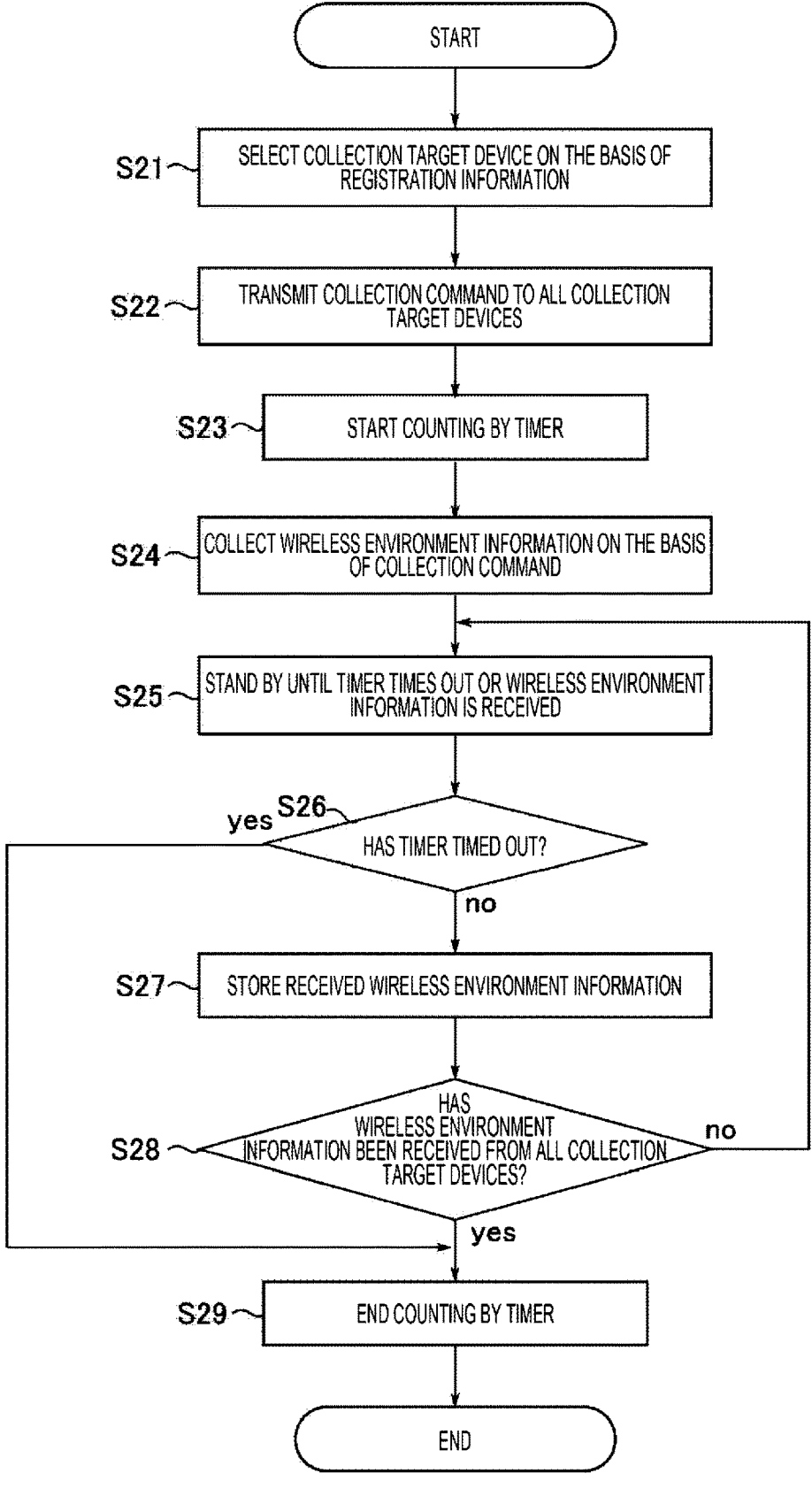
FIG. 10 is a flowchart illustrating an example of a collection operation in the wireless communication management apparatus according to the embodiment.

FIG. 10 is a flowchart illustrating an example of the collection operation in the wireless communication management apparatus according to the embodiment. FIG. 10 corresponds to the processing of S2 in FIG. 9. The wireless communication management apparatus 100 selects a collection target device on the basis of registration information (S21). The wireless communication management apparatus 100 selects a apparatus for which the management target flag is set among the base station 200 and the terminal 300 registered in the registration information as a collection target device. Therefore, the collection target device includes at least one terminal 300. In the following example, it is assumed that all the terminals 300-1 to 300-3 in the wireless communication system 2 are selected as collection target devices.

The wireless communication management apparatus 100 transmits a collection command to all the selected collection target devices (S22). Specifically, the wireless communication management apparatus 100 transmits three collection commands addressed to the IP addresses of the terminals 300-1 to 300-3. After transmitting the collection commands, the wireless communication management apparatus 100 starts counting by the timer 105 (S23). When the collection target device receives the collection command designating itself, the collection target device collects wireless environment information on the basis of the collection command (S24). Then, the collection target device transmits the collected wireless environment information to the wireless communication management apparatus 100.

When the counting by the timer 105 is started, the wireless communication management apparatus 100 stands by until the timer 105 times out or wireless environment information is received from any one of the collection target devices (S25). After the processing of S25, the wireless communication management apparatus 100 determines whether or not the timer 105 has timed out (S26). If the timer 105 times out (S26—Yes), the wireless communication management apparatus 100 ends the counting by the timer (S29).

If the timer 105 has not timed out (S26—No), the wireless communication management apparatus 100 stores the received wireless environment information in the memory 102 (S27). Then, the wireless communication management apparatus 100 determines whether or not wireless environment information has been received from all the collection target devices (S28).

If there is a collection target device whose wireless environment information has not been received (S28—No), the processing proceeds to S25. As a result, the processing of S25 to S28 is repeated until wireless environment information is received from all the collection target devices or the timer 105 times out. If wireless environment information has been received from all the collection target devices (S28—Yes), the wireless communication management apparatus 100 ends the counting by the timer (S29). When the processing of S29 ends, the collection operation ends.

Hereinafter, generation of control information of the base station 200 and the terminal 300 by the control information generation unit 113, that is, the processing of S3 will be described. In particular, in the following description, processing by the determination unit 1131, the evaluation unit 1132, and the selection unit 1133 will be described with reference to FIG. 8.

The determination unit 1131 determines an interference relationship of a combination of bandwidth and channel on the basis of wireless environment information acquired by the terminal 300. The interference relationship is determined on the basis of whether or not a combination of bandwidth and channel of a certain base station 200 or a certain terminal 300 and a combination of bandwidth and channel of an interfering overlapping basic service set (OBSS) are in an overlapping relationship. In one example, the interference relationship is determined by at least one of whether or not the minimum frequencies set for each combination of bandwidth and channel match each other and whether or not the maximum frequencies set for each combination of bandwidth and channel match each other. In a case where the lowest frequencies (highest frequencies) match each other, the determination unit 1131 determines that the combination of bandwidth and channel is in an interference relationship. In a case where the lowest frequencies (highest frequencies) do not match each other, the determination unit 1131 determines that the combination of bandwidth and channel is not in an interference relationship. The interference relationship is determined for each combination of bandwidth and channel of the base station 200 or the terminal 300. The determination unit 1131 generates information indicating the number of interfering OBSSs for each combination of bandwidth and channel of the base station 200 or the terminal 300 on the basis of the interference relationship.

The evaluation unit 1132 evaluates the combination of bandwidth and channel of the base station 200 or the terminal 300 on the basis of information regarding the peripheral BSSs acquired from the determination unit 1131. The evaluation unit 1132 calculates an evaluation value indicating the evaluation of the combination of bandwidth and channel of the base station 200 or the terminal 300. First, the evaluation unit 1132 calculates a total value $L_{all}$ of transmission time ratios in consideration of the overhead on the basis of the following Formula (1).

[Equation 1]

$$L_{all} = \left(\sum T_{tx}\right) L_{OH} \tag{1}$$

Here, $T_{tx}$ is the total time (transmission time) of time lengths of data frames transmitted per unit time. Los is a transmission time ratio introduced to consider the overhead. The total value Lan of transmission time ratios is calculated as the sum of all the base stations 200 and the terminals 300 of the BSS to which the base station 200 and the terminal 300 belong. In addition, the total value Lan of transmission time ratios is calculated for each band, and the transmission time ratio Low is preset for each band. By using the transmission time ratio Low in Formula (1), the carrier sensing time and the response time by an ACK are considered in the calculation of the total value Lan of transmission time ratios.

The evaluation unit 1132 calculates a traffic total value $C_{all}$ in a case where there is no interfering OBSS on the basis of Formula (2-1).

[Equation 2]

$$C_{all} = \sum G_{traffic} \tag{2-1}$$

Here, $G_{traffic}$ is a transmittable traffic amount. The traffic total value $C_{all}$ is calculated as the sum of the traffic amounts $G_{traffic}$ of all the base stations 200 and the terminals 300 in the BSS to which the base stations 200 and the terminals 300 belong. In addition, the traffic total value $C_{all}$ is calculated for each band, and the traffic amount $G_{traffic}$ is set in advance for each band. Note that when the value of the total value $L_{all}$ of transmission time ratios is 1 or more, the traffic total value $C_{all}$ is calculated on the basis of Formula (2-2).

[Equation 3]

$$C_{all} = \frac{1}{L_{all}} \sum G_{traffic} \tag{2-2}$$

The evaluation unit 1132 calculates a degree of congestion Sc on the basis of Formula (3).

[Equation 4]

$$S_c = N_{OBSS} \cdot L_{OBSS} + L_{all} \tag{3}$$

Here, $N_{oBss}$ is the number of interfering OBSSs. $L_{oBss}$ is an assumed usage time rate per interfering OBSS. $L_{oBss}$ is a preset value. The degree of congestion Sc is calculated for each terminal 300 in the BSS to which the base station 200 and the terminal 300 belong and for each combination of bandwidth and channel of the terminal 300.

The evaluation unit 1132 calculates a predicted value $F_s$ of the transmission success rate of a transmission frame by Formula (4) on the basis of the total value Lan of transmission time ratios calculated by Formula (1) and the degree of congestion Sc calculated by Formula (3).

[Equation 5]

$$F_s = \frac{L_{all}}{S_c} \tag{4}$$

As described above, in the present embodiment, the total value $L_{all}$ of transmission time ratios is calculated for each band, and the degree of congestion Sc is calculated for each terminal 300 in the BSS to which the base station 200 and the terminal 300 belong and for each combination of bandwidth and channel of the terminal 300. Therefore, in the calculation of the predicted value $F_s$, the total value Lan of transmission time ratios used for each band is the same. The predicted value $F_s$ is calculated for each terminal 300 in the BSS to which the base station 200 and the terminal 300 belong and for each combination of bandwidth and channel of the terminal 300.

The evaluation unit 1132 calculates a transmission success expectation capacity $C_{calc}$ as the evaluation value on the basis of the traffic total value Can calculated by Formula (2-1) or (2-2) and the predicted value $F_s$ calculated by Formula (4).

[Equation 6]

$$C_{calc} = C_{all} \cdot F_s \tag{5}$$

The traffic total value $C_{all}$ is calculated for each band. The degree of congestion Sc is calculated for each terminal 300 in the BSS to which the base station 200 and the terminal 300 belong and for each combination of bandwidth and channel of the terminal 300. Therefore, in the calculation of the transmission success expectation capacity $C_{calc}$, the traffic total value $C_{all}$ used for each band is the same. The transmission success expectation capacity $C_{calc}$ is calculated for each terminal 300 in the BSS to which the base station 200 and the terminal 300 belong and for each combination of bandwidth and channel of the terminal 300.

The selection unit 1133 selects a combination candidate of bandwidth and channel in the BSS to which the base station 200 and the terminal 300 belong on the basis of the evaluation value acquired from the evaluation unit 1132. For example, the selection unit 1133 calculates the comprehensive evaluation value of the combination of bandwidth and channel on the basis of the evaluation value calculated for each terminal 300 by the evaluation unit 1132. Then, the selection unit 1133 selects a candidate according to at least one candidate selection policy. A candidate selection policy can be appropriately set according to an operation mode or the like in the BSS to which the base station 200 and the terminal 300 belong. In a case where the selection unit 1133 selects a plurality of candidates, the selection unit 1133 further selects one candidate from the plurality of candidate channels. A criterion for selecting one candidate from the plurality of candidates is not particularly limited. In one example, the selection unit 1133 randomly selects one combination candidate of bandwidth and channel from a plurality of candidates. Note that when there is an existing combination candidate of bandwidth and channel already used in the BSS to which the base station 200 and the terminal 300 belong among the plurality of candidates, it is preferable to preferentially select the existing combination.

In one example, the selection unit 1133 calculates, as the comprehensive evaluation value, a value obtained by summing the transmission success expectation capacity $C_{calc}$ as the evaluation value for all the terminals 300. Then, the selection unit 1133 selects the combination of bandwidth and channel having the maximum comprehensive evaluation value. In the present embodiment, the transmission success expectation capacity $C_{calc}$ is calculated for each terminal 300 and for each combination of bandwidth and channel of the terminal 300. Therefore, the selection unit 1133 calculates the sum of transmission success expectation capacities $C_{calc}$ for all the terminals 300 for each combination of bandwidth and channel. The selection unit 1133 selects a combination of bandwidth and channel corresponding to the maximum sum of transmission success expectation capacities $C_{calc}$ among the sums of transmission success expectation capacities $C_{calc}$ calculated for each combination of bandwidth and channel.

In another example, the selection unit 1133 calculates the standard deviation as the comprehensive evaluation value with respect to the transmission success expectation capacities $C_{calc}$ of all the terminals 300 for each combination of bandwidth and channel. The selection unit 1133 selects the combination of bandwidth and channel having the minimum comprehensive evaluation value, that is, the minimum standard deviation.

In addition, the selection unit 1133 calculates a ratio $maxC_{calc}/minC_{calc}$ as the comprehensive evaluation value for each combination of bandwidth and channel by using a maximum transmission success expectation capacity $maxC_{calc}$ and a minimum transmission success expectation capacity $minC_{calc}$ among the transmission success expectation capacities $C_{calc}$ of all the terminals 300. The selection unit 1133 selects a combination of bandwidth and channel having the minimum comprehensive evaluation value, that is, the minimum ratio $maxC_{calc}/minC_{calc}$.

Figure 11:
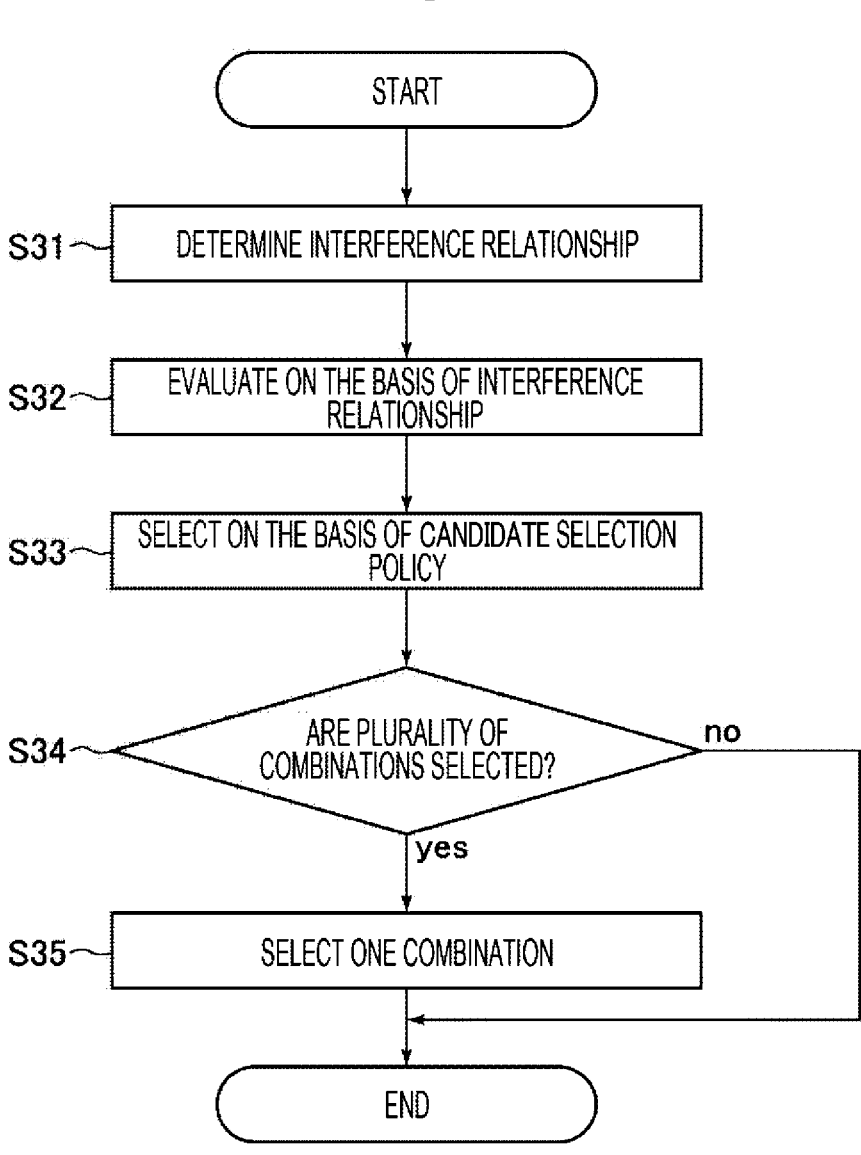
FIG. 11 is a flowchart illustrating an example of processing of selecting a combination of bandwidth and channel as processing of generating control information by the wireless communication management apparatus according to the embodiment.

FIG. 11 is a flowchart illustrating an example of processing of selecting a combination of bandwidth and channel as processing of generating control information by the wireless communication management apparatus 100 according to the embodiment. FIG. 11 corresponds to the processing of S3 in FIG. 9. As described above, the wireless communication management apparatus 100 determines an interference relationship for each combination of bandwidth and channel on the basis of wireless environment information (S31). The wireless communication management apparatus 100 evaluates each combination of bandwidth and channel on the basis of the determined interference relationship (S32). The wireless communication management apparatus 100 selects a combination of bandwidth and channel on the basis of the evaluation value and the candidate selection policy (S33). If a plurality of combinations of bandwidth and channel are selected (S34—Yes), the processing proceeds to S35. If one combination of bandwidth and channel is selected (S34—No), the processing ends. The wireless communication management apparatus 100 randomly selects one combination from the plurality of combinations (S35). When the processing of S35 ends, the processing of selecting a combination of bandwidth and channel ends.

As described above, according to the embodiment, the wireless communication management apparatus 100 includes the determination unit 1131, the evaluation unit 1132, and the selection unit 1133. The determination unit 1131 determines an interference relationship of a combination of bandwidth and channel on the basis of wireless environment information collected from one or more terminals capable of wireless communication with the base station. The evaluation unit 1132 calculates an evaluation value for each combination of bandwidth and channel on the basis of the interference relationship. The selection unit 1133 selects one combination from the combinations of bandwidth and channel on the basis of the evaluation value. As a result, an optimal combination of bandwidth and channel is selected as the BSS, and a decrease in throughput can be curbed.

Note that various modifications can be applied to the above-described embodiment. For example, while the above embodiment describes a case where the terminal 300 and the base station 200 perform wireless communication directly, the present invention is not limited thereto. For example, the terminal 300 and the base station 200 may be configured to wirelessly communicate with each other via a base station (relay base station) that relays wireless communication.

Furthermore, for example, while the above embodiment describes a case where the wireless communication management program is executed by the on-premises wireless communication management apparatus 100, the present invention is not limited thereto. For example, the wireless communication management program may be executed on a calculation resource on the cloud.

Furthermore, for example, while the above embodiment describes a case where the wireless communication management apparatus 100 is connected to the base station 200 via the network NW, the present invention is not limited thereto. For example, the wireless communication management apparatus 100 may be provided in the wireless communication system 2 and function as the root base station 200. In this case, the wireless communication management apparatus 100 may be configured to have both the functional configuration illustrated in FIG. 5 and the functional configuration illustrated in FIG. 6.

Furthermore, for example, in the above-described embodiment, some of the terminals 300 in the wireless communication system 2 may be selected as collection target devices. In this case, position information of the GPS module 306 included in the terminal 300 may be used. For example, in a case where the number of terminals 300 is excessive and the collection operation takes time, the wireless management apparatus 100 selects a representative terminal as a collection target device from among the terminals 300 close to each other on the basis of the position information of the GPS module 306. The wireless management apparatus 100 collects wireless environment information on the collection target terminal on the basis of the positional information of GPS module 306. The wireless management apparatus 100 performs the processing of the above-described embodiment on the basis of OBSS information and channel information collected from a small number of terminals 300 selected as representatives. In this way, the wireless management apparatus 100 can efficiently perform the collection operation on the basis of the position information of the GPS module 306, and can efficiently perform the entire processing of the above-described embodiment.

Note that the present invention is not limited to the foregoing embodiments and various modifications can be made in the implementation stage without departing from the gist of the invention. In addition, each embodiment may be implemented in appropriate combination, and in that case, combined effects can be obtained. Furthermore, the embodiments described above include various inventions, and various inventions can be extracted by a combination selected from a plurality of disclosed components. For example, even if some components are deleted from all the components described in the embodiments, in a case where the problem can be solved and the effects can be obtained, a configuration from which the components are deleted can be extracted as an invention.

REFERENCE SIGNS LIST

1 Communication system
2 Wireless communication system
100 Wireless communication management apparatus
200-1, 200-2 Base station
300-1, 300-2, 300-3 Terminal
400 External server
500 Data server
101, 201, 301 Control circuit
102, 202, 302 Memory
103, 203 Wired communication module
104 User interface
105 Timer
106 Drive
107 Storage medium
204, 303 Wireless communication module
304 Sensor
305 Battery
111 User input unit
112, 211 Wired signal reception unit
113 Control information generation unit
114 Determination unit
115, 215 Wired signal transmission unit
116 Command library
212, 311 Wireless signal reception unit
213, 312 Collection unit
214, 313 Update unit
216, 314 Wireless signal transmission unit
1131 Determination unit
1132 Evaluation unit
1133 Selection unit

The invention claimed is:

1. A wireless communication management apparatus comprising processing circuitry configured to:

determine an interference relationship of a combination of bandwidth and channel on the basis of wireless environment information collected from one or more terminals capable of wireless communication with a base station;

calculate an evaluation value for each of combinations of bandwidth and channel on the basis of the interference relationship; and select one of the combinations of bandwidth and channel on the basis of the evaluation value wherein the processing circuitry is configured to determine the interference relationship on the basis of whether or not the combination of bandwidth and channel in a terminal and the combination of bandwidth and channel in an interfering overlapping basic service set (OBSS) are in an overlapping relationship, and the processing circuitry is configured to calculate a total value of transmission time ratios for each bandwidth on the basis of at least a transmission time ratio for each bandwidth in consideration of an overhead and a transmission time of the terminal, and calculate a degree of congestion in the combination of bandwidth and channel in the terminal on the basis of information indicating a number of OBSSs that interfere with the combination of bandwidth and channel in the terminal and the total value.

2. The wireless communication management apparatus according to claim 1, wherein the processing circuitry is configured to calculate a transmission success expectation capacity in the combination of bandwidth and channel in the terminal as the evaluation value on the basis of the degree of congestion.

3. The wireless communication management apparatus according to claim 1, wherein the processing circuitry is configured to calculate a comprehensive evaluation value of the combination of bandwidth and channel on the basis of the evaluation value calculated for each of the terminals.

4. The wireless communication management apparatus according to claim 3, wherein the processing circuitry is configured to make a selection of the one the combinations of bandwidth and channel on the basis of at least one candidate selection policy selected from calculating a sum of evaluation values as the comprehensive evaluation value and selecting the combination corresponding to a maximum comprehensive evaluation value, calculating a standard deviation of the evaluation values as the comprehensive evaluation value and selecting the combination corresponding to a minimum comprehensive evaluation value, and calculating a ratio of a maximum value of the evaluation values to a minimum value of the evaluation values as the comprehensive evaluation value and selecting the combination corresponding to the minimum comprehensive evaluation value.

5. The wireless communication management apparatus according to claim 1, wherein the wireless environment information is wireless environment information regarding a terminal selected from among the one or more terminals on the basis of position information.

6. A wireless communication management method comprising:

determining an interference relationship of a combination of bandwidth and channel on the basis of wireless environment information collected from one or more terminals capable of wireless communication with a base station;

calculating an evaluation value for each of combinations of bandwidth and channel on the basis of the interference relationship; and selecting one of the combinations of bandwidth and channel on the basis of the evaluation value wherein the determining an inference relationship includes determining the interference relationship on the basis of whether or not the combination of bandwidth and channel in a terminal and the combination of bandwidth and channel in an interfering overlapping basic service set (OBSS) are in an overlapping relationship, and the calculating an evaluation value includes calculating a total value of transmission time ratios for each bandwidth on the basis of at least a transmission time ratio for each bandwidth in consideration of an overhead and a transmission time of the terminal, and calculating a degree of congestion in the combination of bandwidth and channel in the terminal on the basis of information indicating a number of OBSSs that interfere with the combination of bandwidth and channel in the terminal and the total value.

7. A non-transitory tangible computer-readable storage medium storing a program for causing a hardware processor to execute:

determining an interference relationship of a combination of bandwidth and channel on the basis of wireless environment information collected from one or more terminals capable of wireless communication with a base station;

calculating an evaluation value for each of combinations of bandwidth and channel on the basis of the interference relationship; and selecting one of the combinations of bandwidth and channel on the basis of the evaluation value wherein the determining an interference relationship includes determining the interference relationship on the basis of whether or not the combination of bandwidth and channel in a terminal and the combination of bandwidth and channel in an interfering overlapping basic service set (OBSS) are in an overlapping relationship, and the calculating an evaluation value includes calculating a total value of transmission time ratios for each bandwidth on the basis of at least a transmission time ratio for each bandwidth in consideration of an overhead and a transmission time of the terminal, and calculating a degree of congestion in the combination of bandwidth and channel in the terminal on the basis of information indicating a number of OBSSs that interfere with the combination of bandwidth and channel in the terminal and the total value.

* * * * *